United States Patent
Haepp

(10) Patent No.: US 7,674,045 B2
(45) Date of Patent: *Mar. 9, 2010

(54) CAGE FOR INCLINED BALL BEARINGS

(75) Inventor: Alexander Haepp, Lendershausen (DE)

(73) Assignee: Schaeffler KG, Herzogenaurach (DE)

( * ) Notice: Subject to any disclaimer, the term of this patent is extended or adjusted under 35 U.S.C. 154(b) by 724 days.

This patent is subject to a terminal disclaimer.

(21) Appl. No.: 10/599,075

(22) PCT Filed: Mar. 18, 2005

(86) PCT No.: PCT/DE2005/000503

§ 371 (c)(1),
(2), (4) Date: Sep. 19, 2006

(87) PCT Pub. No.: WO2005/090808

PCT Pub. Date: Sep. 29, 2005

(65) Prior Publication Data

US 2007/0189651 A1 Aug. 16, 2007

(30) Foreign Application Priority Data

Mar. 20, 2004 (DE) .................... 10 2004 013 803

(51) Int. Cl.
*F16C 33/38* (2006.01)
(52) U.S. Cl. ............................. 384/523; 384/526
(58) Field of Classification Search ............ 384/523–534
See application file for complete search history.

(56) References Cited

U.S. PATENT DOCUMENTS

| 4,560,291 | A | | 12/1985 | Bonengel et al. |
| 4,626,113 | A | * | 12/1986 | Forknall et al. ............. 384/530 |
| 4,804,276 | A | * | 2/1989 | Olschewski et al. ......... 384/526 |
| 7,524,116 | B2 | * | 4/2009 | Haepp ........................ 384/523 |
| 2001/0036329 | A1 | | 11/2001 | Chambert |
| 2007/0206893 | A1 | * | 9/2007 | Felis et al. .................. 384/528 |

FOREIGN PATENT DOCUMENTS

| DE | 37 06 013 A | 9/1988 |
| FR | 2 665 231 A | 1/1992 |

* cited by examiner

*Primary Examiner*—Thomas R Hannon
(74) *Attorney, Agent, or Firm*—Lucas & Mercanti, LLP

(57) ABSTRACT

The invention relates to a cage for inclined ball bearings with adjacent ball pockets arranged on the circumferential side around a rotational axis of the cage, comprising ribs between lateral walls. Each rib extends in the axial direction from one of the lands and connects two of the lateral walls together on the circumferential side.

17 Claims, 3 Drawing Sheets

CAGE FOR INCLINED BALL BEARINGS

FIELD OF THE INVENTION

The present invention relates to a cage for inclined ball bearings having ball pockets which are adjacent to one another on the circumferential side about a rotational axis of the cage, the ball pockets being delimited on the circumferential side by webs and, in at least one axial direction of the cage, in each case by a side wall having an approximately uniform wall thickness.

BACKGROUND OF THE INVENTION

A cage of this type is described in DE 3706013 A1. The cage has two side rings which are connected to one another by webs. One of the side rings is arranged on one side of the cage above the pitch circle and another of the side rings is arranged below the pitch circle. The side rings of the cage are provided with annular grooves, starting from the end sides. Cages of this type are manufactured from plastic. Typical examples of materials which are used for the manufacture of cages of this type are polyamides which are reinforced with glass or with carbon fibers (for example, PA66/GF).

The side rings are also known as side rims. According to DE 3706013 A1, the annular grooves are provided in the side rims, in order to configure the wall thicknesses of the rims to be as thin as possible and in order to achieve uniform wall thicknesses in all regions of the side rims. Uniform wall thicknesses and wall thickness transitions are aimed for during injection molding of plastic parts, in order to avoid interruptions of the material flow/bubbles of the cage material in the cavities of the injection molding dies at the transition from thick to thin cross sections. Moreover, identical cooling speeds are achieved in all regions of the workpiece as a result of uniform wall thicknesses. Faults from undesired weakening in thin wall regions are also avoided by flow paths in cavities which are as short as possible with a relatively small injection cross section.

The thin-walled configuration is subject to limitations as a result of the requirements for high operating strength of the cage. Otherwise, thin-walled plastic parts are extremely unstable after removal from the die and frequently lose their intended shape or geometry during subsequent cooling and during storage.

Cages of the generic type under consideration are particularly difficult to design if they additionally have retaining lugs. Said retaining lugs are formed as a rule on one of the side rims and engage into a corresponding circumferential groove on one of the bearing rings of the inclined ball bearing. The cages, together with the balls and the corresponding bearing ring, are preassembled via the retaining lugs to form a structural unit, from which the balls which are snapped into the ball pockets of the cage cannot fall during assembly in the other bearing ring of the inclined ball bearing. Holding lugs of this type are also provided for axial path limitation of the cage in a bearing.

During assembly of the cage on the bearing ring, the retaining lugs are either compressed or extended elastically until the retaining lugs snap into a corresponding groove of the bearing ring. The wall thicknesses in the region of the transition of the retaining lugs into the cage and of the cage therefore have to be of sufficiently stable dimensions, in order not to be deformed plastically permanently during assembly of the cage on or in the bearing ring. On the other hand, the retaining lugs have to be elastic enough, in order not to make assembly of the cage in the bearing difficult and in order to prevent damage to the cage or the retaining lugs during assembly.

SUMMARY OF THE INVENTION

It is therefore the object of the invention to provide a cage which meets the above-mentioned and partially contradictory requirements of manufacturability, of inexpensive manufacture and of function in an optimum manner.

This object is achieved according to the subject matter of claim 1. The ball pockets of this cage are delimited on the circumferential side by webs which are oriented at least transversely with respect to the circumferential direction of the cage and in each case by a side wall with an approximately uniform wall thickness in at least one axial direction of the cage. Each of the side walls connects two webs, which lie opposite one another, to one another, on the circumferential side.

According to the invention, the side walls are arched at least in the axial direction, starting from the webs, and protrude in the axial direction from the webs. The outer contours of the side walls of pockets which follow one another on the circumferential side are removed freely from one another on the circumferential side increasingly with increasing spacing from the web in the axial direction, with the result that the cage is provided at least on the end side with gaps which extend partially between the pockets in the direction of the webs. The cusp of the arches which protrudes axially the furthest on the outside on each end wall protrudes axially the furthest from the cage in the axial direction.

One rib emanates in the axial direction from one of the webs respectively and connects two of the side walls of pockets which follow one another on the circumferential side to one another. Each of the ribs protrudes from the web in the axial direction at most to the extent that the side walls protrude at most in the axial direction starting from the web, but not further.

At least one of the relatively thick-walled side rims which are usually formed on both sides of cages of the generic type is omitted on the cage according to the invention. Instead, the cage is provided, on at least one end side between the arched side walls of the pockets, in each case with a rib which is oriented circumferentially or tangentially between the individual pockets which follow one another. Less material is used for the manufacture of the cage and the functional strength is ensured via the composite structure of ribs and side walls.

Ribs, which are oriented on the circumferential side, between the side walls are preferably curved in such a way that all arbitrary points of a rib face which faces the rotational axis are spaced apart radially to the same extent from the rotational axis of the cage. As a result of the axially outwardly arched side walls, the rib face is widened in the circumferential direction with increasing axial spacing from the respective web. Each of the gaps is preferably delimited radially toward the rotational axis by one of the ribs. The ribs merge axially into the web in such a way that the greatest radial spacing of the ribs at the side of the ribs facing the rotational axis from the rotational axis is at most equally as large as the smallest radial spacing of each of the webs from the rotational axis.

The cage optionally has a side rim which delimits the pockets in the opposite direction of the end side, on which the ribs are formed.

As, in cages for inclined ball bearings of the generic type, one of the side rims usually extends radially below the pitch circle of the balls and one of the side rims usually extends radially above the pitch circle of the balls, the result for a cage according to the invention is that the smallest radial spacing of the side rim from the rotational axis of the cage is greater than the greatest radial spacing of the side walls from the rotational axis.

A further embodiment of the invention provides a cage for inclined ball bearings having retaining lugs which are designed in a sprung resilient manner. The retaining lugs are provided for axially securing the cage in a retaining groove on the inner ring or the outer ring. Each of the retaining lugs emanates from one of the arched side walls and is adjacent on the circumferential side to further retaining lugs. The retaining lugs preferably protrude initially radially from the side walls, and then point obliquely in the direction of the rotational axis.

The attachment of the retaining lugs to the side walls is of elastic design. To this end, a groove is made in the material of the cage in each case at the transition from the side wall to the retaining lug. The groove is oriented on the circumferential side or tangentially with respect to the rotational axis. The wall thickness of the side wall is reduced by the groove which is open in the axial direction. The cross section of the groove, in a longitudinal section of the cage along the rotational axis, is described by a radius. The groove provides an elastic predetermined bending point between the cage and the retaining lug which makes assembly easier and protects the cage from damage.

Further embodiments of the invention are described in the section "Detailed Description of the Drawings".

BRIEF DESCRIPTION OF THE DRAWINGS

In the following text, the invention will be described in greater detail using an exemplary embodiment. In the drawings, in detail.

DETAILED DESCRIPTION OF THE DRAWINGS

Figure 1:
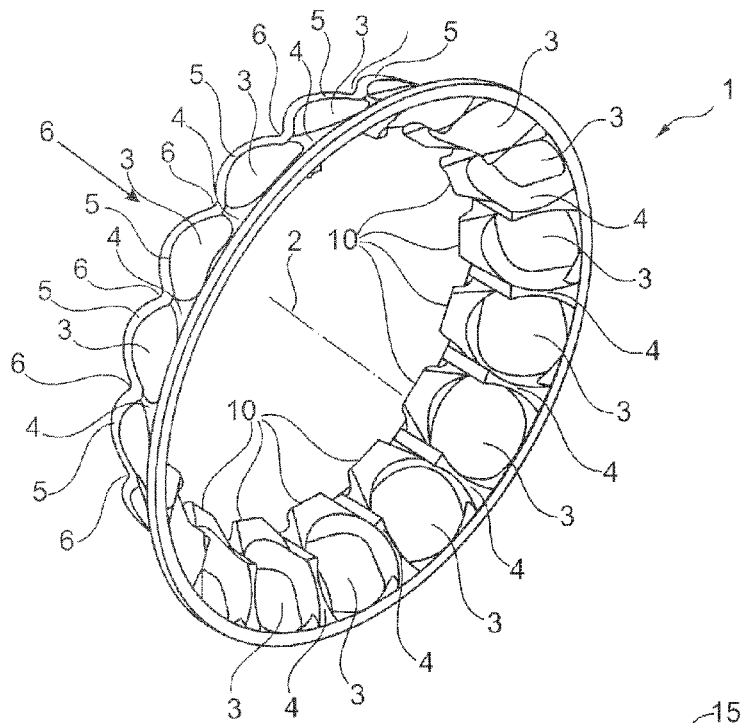
FIG. 1 shows the overall view of an exemplary embodiment of a cage according to the invention.
Figure 2:
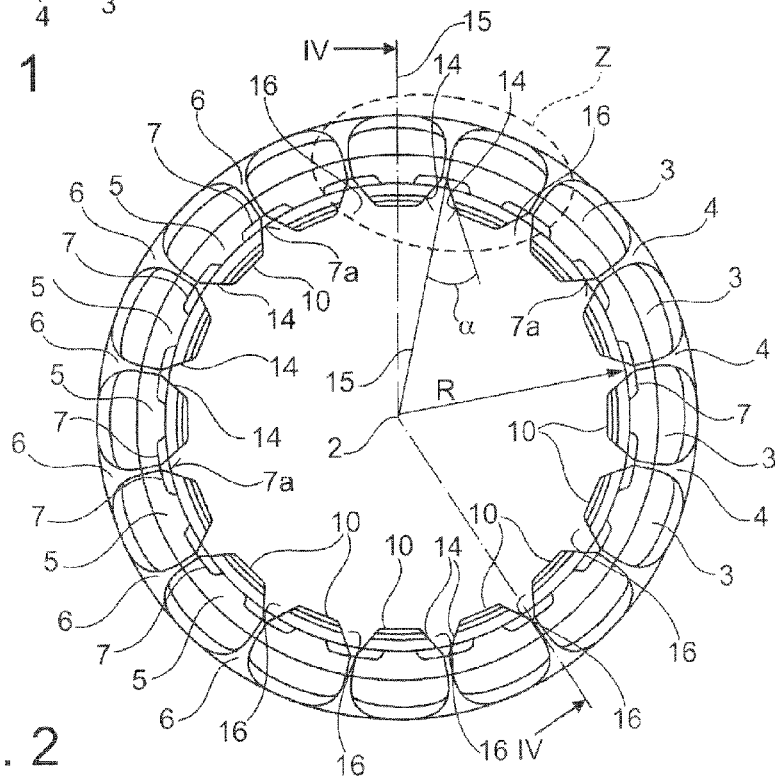
FIG. 2 shows the front view of the cage from FIG. 1 in the direction of the arrow.
Figure 3:
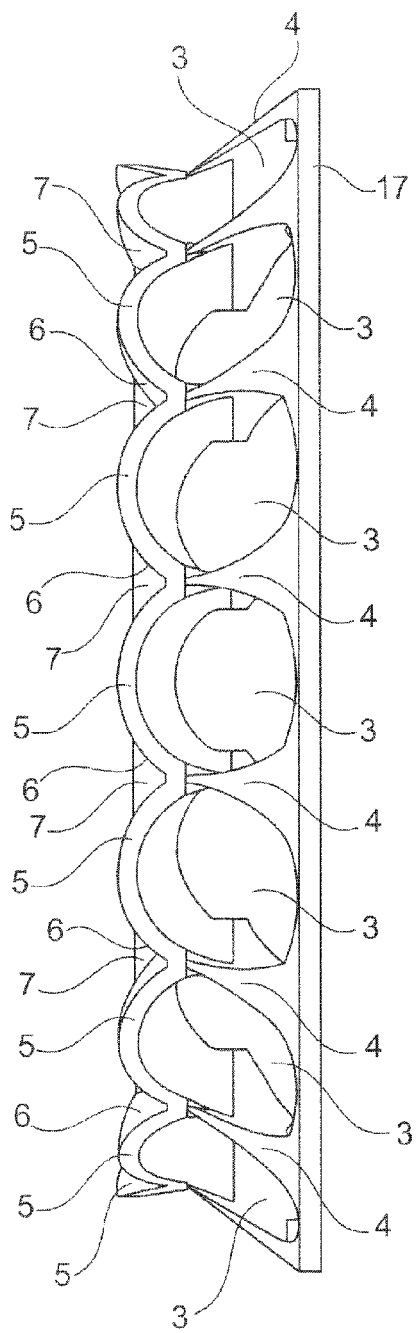
FIG. 3 shows a side view of the cage.
Figure 5:
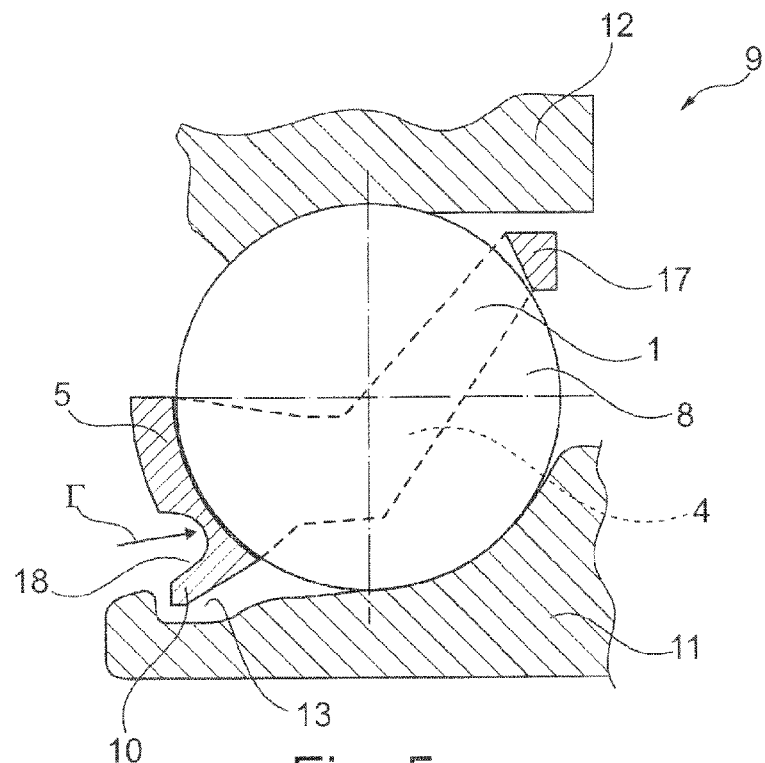
FIG. 5 shows a partial view of an inclined ball bearing having the cage according to FIG. 1, illustrated in longitudinal section.

FIGS. 1 to 3 show an exemplary embodiment of a cage 1 according to the invention. The cage has ball pockets 3 which are adjacent on the circumferential side about its rotational axis 2 with respect to one another with a uniform pitch. A ball 8 is guided in each individual ball pocket 3. FIG. 5, a sectional partial view of an inclined ball bearing 9, shows the cage 1 which is arranged radially between an inner ring 11 and an outer ring 12 with balls 8. The ball pockets 3 are delimited by webs 4 which extend transversely with respect to the circumferential direction. On one end side, the cage 1 is delimited by side walls 5 having an approximately uniform wall thickness.

Figure 6:
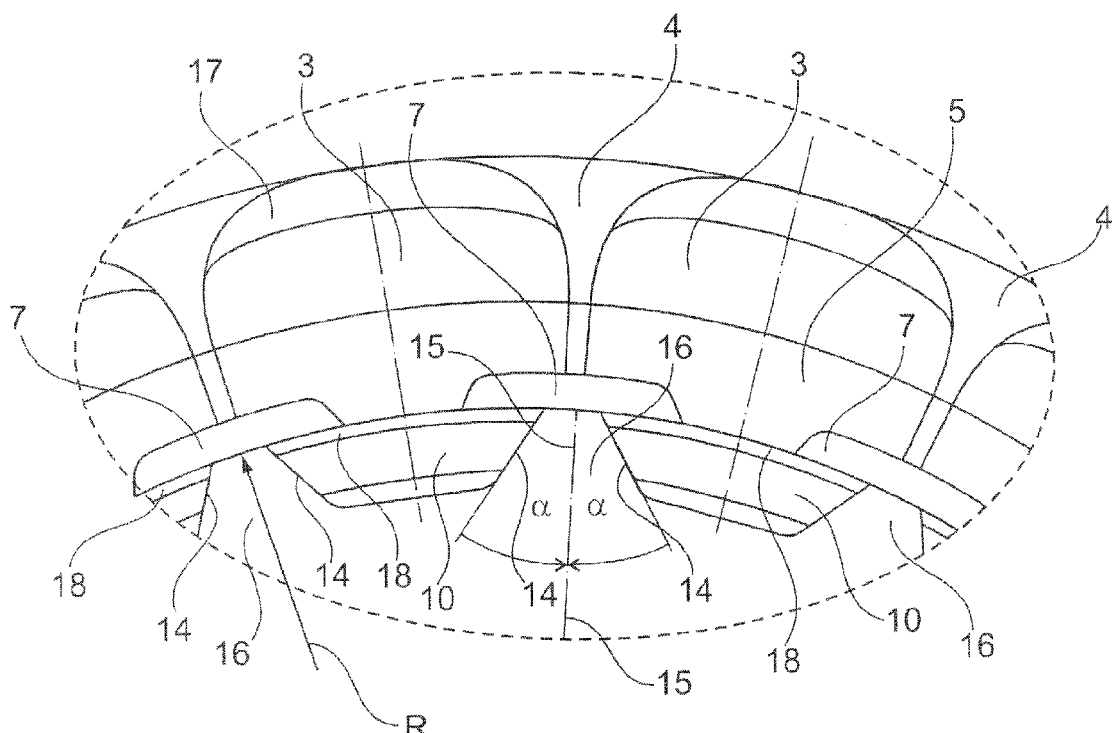
FIG. 6 shows the detail Z from FIG. 2 in a much enlarged illustration.

The side walls 5 are arched from the webs 4 in the axial direction, with the result that axial gaps 6 are formed on the end side of the cage 1. The gaps 6 are delimited in the radial direction of the rotational axis 2 by in each case one rib 7. The ribs 7 are oriented in the circumferential direction and extend in a curved manner in the circumferential directions (FIGS. 2 and 6). Whereas the curvatures of the ribs 7 are described by a common radius R which emanates from the rotational axis 2. All arbitrary points of the rib face 7a which faces the rotational axis 2 are spaced apart from the rotational axis 2 by the radius R. The ribs 7 widen in the axial direction, starting from the webs 4.

As can be seen from FIG. 3, each of the ribs 7 does not protrude in the axial direction from the respective web 4 as far as the side walls 5 at most protrude axially from the cage 1 in the axial direction from the web 4.

The cage 1 has retaining lugs 10 which are resilient in a sprung manner. The retaining lugs 10 engage radially into an annular groove 13 of the inner ring 11. The cage 1 is secured axially with play on the inner ring 11 by means of the retaining lugs 10. Flanks 14, which face in the circumferential direction, on the retaining lugs 10 extend in an inclined manner with respect to one another (FIG. 2, FIG. 6). In this case, the flanks 14 are inclined with respect to one another in such a way that the spacing of the retaining lugs 10 which are spaced apart in each case with respect to one another by a circumferential gap 16 increases in the direction of the rotational axis 2. The flanks 14, preferably flat surfaces or straight edges, are inclined by an angle a with respect to an imaginary plane 15 which emanates from the rotational axis 2 and is aligned with the rotational axis 2 a preferably has a value of 30°.

The thickness of the side walls is reduced by a groove 18 between each of the side walls 5 and one of the retaining lugs 10. In the longitudinal section according to FIG. 5, the groove 18 is described by a radius r. Each of the grooves 18 is delimited radially to the outside proportionately by one of the side walls 5 and by two of the ribs 7 which are separated from one another in the circumferential direction by one of the side walls 5 (FIG. 6). Grooves 18 which are adjacent to one another in the circumferential direction are delimited in pairs, radially to the outside, jointly by at least one of the ribs 7. The retaining lugs 10 and the ribs 7 do not protrude in the axial direction as far as the side walls 5 are arched from the webs 4 in the axial direction.

Figure 4:
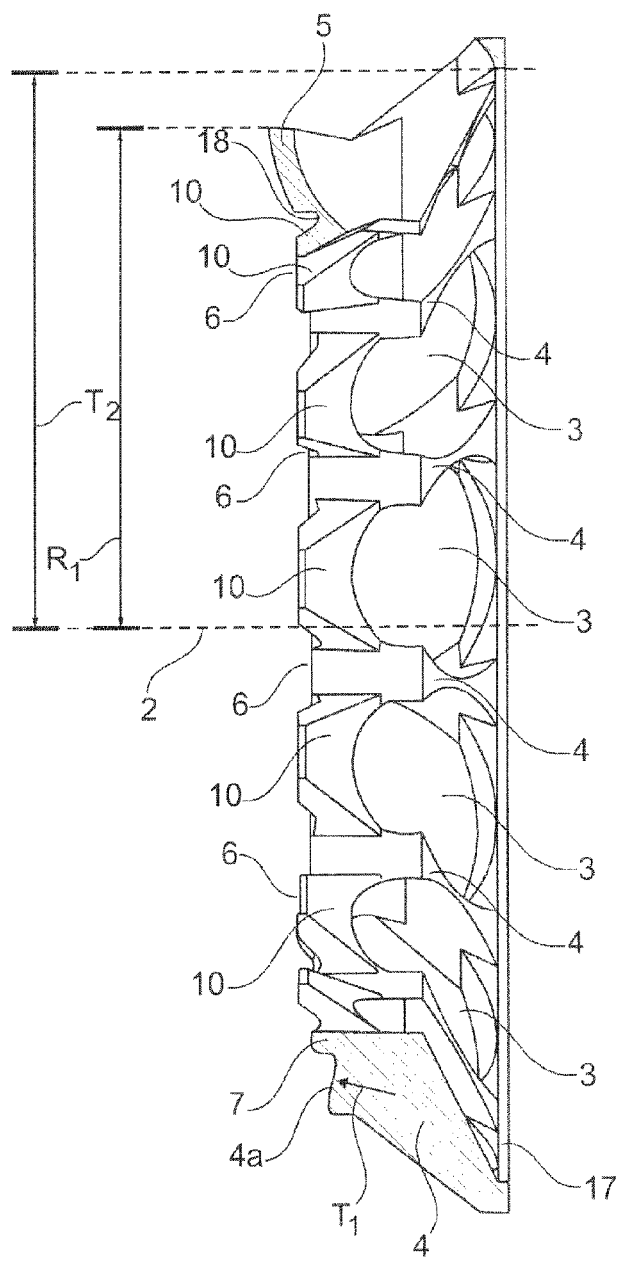
FIG. 4 shows a longitudinal section through the cage along the line IV-IV according to FIG. 2.

The ball pockets 3 are delimited in the opposite direction to the side walls 5 by means of a side rim 17. The cross section of the side rim 17 in axial directions is approximately adapted to the thickness of the side walls 5 (FIG. 5). As can be seen from FIG. 4, the webs 4 extend from the side rim 17 initially in an inclined manner in the direction of the rotational axis 2 and then extend in the axial direction. The end side $4a$ of the webs 4 in the gaps 6 and over the ribs 7 is described by a radius $r_1$. The smallest radial spacing, which is described by the radius $r_2$, of the side rim 17 from the rotational axis is greater than the greatest radial spacing, which is described by the radius $R_1$, of the side walls 5 from the rotational axis.

LIST OF DESIGNATIONS

1 Cage
2 Rotational axis
3 Ball pocket
4 Web
4a End side
5 Side wall
6 Gap
7 Rib
7a Rib face
8 Ball
9 Inclined ball bearing
10 Retaining lug 11 Inner ring
12 Outer ring
13 Annular groove
14 Flanks
15 Plane
16 Circumferential gap
17 Side rim
18 Groove

The invention claimed is:

1. A cage for inclined ball bearings, comprising:
a side wall and a side rim spaced axially apart, interconnected by webs and defining ball pockets, the side wall having an approximately uniform wall thickness, an arched portion of the side wall defining each of the ball pockets and being arched in an axial direction from the webs;
ribs distributed circumferentially around the cage, each of the ribs protruding in an axial direction from a respective one of the webs and each of the ribs connects one arched portion of the side wall defining a ball pocket to an adjacent arched portion of the side wall defining an adjacent ball pocket on the circumferential side of the cage, and each of the ribs protruding axially to an equal extent as the arched portions of the side wall defining each of the ball pockets.

2. A cage of claim 1, wherein
each of the ribs are oriented in the circumferential direction and extend in a curved manner in the circumferential direction.

3. The cage of claim 2, wherein
a gap is formed between adjacent arched portions of the side wall and each gap is delimited radially towards a rotational axis of the cage by one of the ribs.

4. The cage of claim 3, wherein
each of the ribs has a rib face facing the rotational axis and the rib face widening in the circumferential direction with increased axially spacing from the one of the webs.

5. The cage of claim 1, wherein
each of the ribs is spaced a radial distance from a rotational axis of the cage that is no greater than a smallest radial spacing of each of the webs from the rotational axis of the cage.

6. The cage of claim 1, wherein
the side rim is on the circumferential side of the cage.

7. The cage of claim 6, wherein
the side rim is spaced a radial distance from a rotational axis of the cage greater than a greatest radial spacing of the side wall from the rotational axis of the cage.

8. The cage of claim 1, further comprising:
retaining lugs distributed circumferentially around the cage, one of the retaining lugs extending axially from the arched portions of the side wall defining each of the ball pockets.

9. The cage of claim 8, wherein
each arched portion of the side wall defining a ball pocket has a groove, each groove being delimited in the direction of a rotational axis of the cage by one of the retaining lugs.

10. The cage of claim 9, wherein
each groove has a radius when viewed in a longitudinal section along a rotational axis of the cage.

11. The cage of claim 9, wherein
each groove is delimited radially outwardly by the arched portions of the side wall defining a ball pocket and two adjacent ribs which are separated from one another in a circumferential direction by the arched portion of the side wall.

12. The cage of claim 9, wherein
the grooves are delimited in pairs, radially outwardly by one of the ribs.

13. The cage of claim 8, wherein
each of the retaining lugs protrudes axially at most to the arched portion of the side wall defining the ball pocket.

14. The cage of claim 8, wherein
a circumferential gap is formed between adjacent retaining lugs, each circumferential gap being delimited radially outwardly by one of the webs and one of the ribs.

15. The cage of claim 8, wherein
each of the retaining lugs has flanks which face a circumferential direction and are inclined with respect to one another.

16. The cage of claim 15, wherein
a circumferential gap is formed between flanks of adjacent retaining lugs, and the circumferential gap increases in size in a direction of the rotational axis of the cage.

17. The cage of claim 15, wherein
the flanks are inclined by an angle with respect to an imaginary plane which emanates from and is aligned with a rotational axis of the cage.

* * * * *